United States Patent
Fujiwara et al.

(10) Patent No.: US 7,794,128 B2
(45) Date of Patent: Sep. 14, 2010

(54) LAMP UNIT OF VEHICLE HEADLAMP

(75) Inventors: Shohei Fujiwara, Shizuoka (JP); Hiroyuki Ishida, Shizuoka (JP); Michio Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 59 days.

(21) Appl. No.: 12/036,364

(22) Filed: Feb. 25, 2008

(65) Prior Publication Data
US 2008/0225544 A1 Sep. 18, 2008

(30) Foreign Application Priority Data
Mar. 14, 2007 (JP) ............... 2007-065061

(51) Int. Cl.
*F21S 8/10* (2006.01)
(52) U.S. Cl. .................. 362/545; 362/538; 362/459; 362/507; 362/487; 362/543; 362/544; 362/546; 362/549
(58) Field of Classification Search .......... 362/545, 362/538, 459, 507, 487, 543, 544, 546, 549
See application file for complete search history.

(56) References Cited
U.S. PATENT DOCUMENTS

| | | | | |
|---|---|---|---|---|
| 5,546,284 | A * | 8/1996 | Harada | 362/487 |
| 6,120,169 | A * | 9/2000 | Sato | 362/517 |
| 6,736,533 | B2 * | 5/2004 | Matsumoto et al. | 362/539 |
| 7,156,544 | B2 * | 1/2007 | Ishida | 362/538 |
| 7,407,310 | B2 * | 8/2008 | Komatsu | 362/509 |
| 7,441,913 | B2 * | 10/2008 | Bayersdorfer | 362/29 |
| 2007/0025117 | A1 * | 2/2007 | Watanabe et al. | 362/545 |

FOREIGN PATENT DOCUMENTS

| | | |
|---|---|---|
| DE | 19946078 A1 | 3/2001 |
| DE | 102005028456 A1 | 12/2006 |
| JP | 2004-111355 | 4/2004 |
| JP | 2004-241388 | 8/2004 |
| JP | 2004-342574 | 12/2004 |

OTHER PUBLICATIONS

Patent Abstracts of Japan, Publication No. 2004-342574 dated Dec. 2, 2004, 2 pages.
Patent Abstracts of Japan, Publication No. 2004-241388 dated Aug. 26, 2004, 2 pages.
Patent Abstracts of Japan, Publication No. 2004-111355 dated Apr. 8, 2004, 2 pages.
German Office Action for Application No. 10 2008 009 820.5-54, mailed on Jul. 17, 2009 (6 pages).

* cited by examiner

*Primary Examiner*—Sandra L O'Shea
*Assistant Examiner*—Jessica L McMillan
(74) *Attorney, Agent, or Firm*—Osha Liang LLP (57) ABSTRACT

A vehicle lamp includes a plurality of semiconductor light emitting devices and a reflector for reflecting light emitted from the semiconductor light emitting devices toward a front side of the vehicle lamp. The reflector is formed into a shape whose front area is open. A plate-like partition member is disposed inside the reflector to partition the reflector into a plurality of reflecting areas. The semiconductor light emitting devices are mounted on the plate-like partition member in respective reflecting areas such that optical axes of the semiconductor light emitting devices are directed in a direction substantially perpendicular to a lamp optical axis.

13 Claims, 5 Drawing Sheets

LAMP UNIT OF VEHICLE HEADLAMP

CROSS-REFERENCE TO RELATED APPLICATIONS

This application is based on and claims priority from Japanese Patent Application No. 2007-065061, filed on Mar. 14, 2007, the entire contents of which are hereby incorporated by reference.

FIELD OF THE INVENTION

The present disclosure relates to a vehicle lamp including a plurality of semiconductor light emitting devices, and a reflector for reflecting light from the semiconductor light emitting devices to a forward area of the lamp.

BACKGROUND ART

In recent years, various vehicle lamps that are effective for a reduction of power consumption and a reduction of heat generation have been proposed (see e.g., Japanese Unexamined Patent Documents; JP-A-2004-342574; JP-A-2004-241388; and JP-A-2004-111355). According to such configurations, a light source supporting column shaped into a circular or square column is provided on a center axis (optical axis) of a reflector whose reflecting surface is formed like an almost hemisphere and then a plurality of LEDs (semiconductor light emitting devices) as a light source are arranged on an outer peripheral surface of the light source supporting column.

However, in configurations such as the above in which the plurality of LEDs are arranged around the light source supporting column positioned on the center axis of the reflector, the LEDs, which also serve as heating elements, are arranged densely on the light source supporting column at a high density. Therefore, a sufficient heat radiation area cannot be secured around the LEDs, and there is a risk that a luminous efficiency of the LEDs is decreased or a life of the LEDs is shortened due to the excessive temperature rise.

Also, in the above Patent Documents, there is disclosed a reflector whose plural reflecting surfaces, each having different reflecting characteristics, are formed around the light source supporting column on which the LEDs are arranged. The plural reflecting surfaces shift positions in the circumferential direction, so that a plurality of light distribution patterns can be given by one lamp. However, light emitted from one LED is incident on plural reflecting surfaces having different light distribution patterns respectively, or a part of the light reflected by one reflecting surface is reflected again by other reflecting surfaces. As a result interference occurs between plural light distribution patterns. Thus, a problem has arisen that it is difficult to control respective light distribution patterns with high precision.

SUMMARY OF INVENTION

One or more embodiments of the present invention provide a vehicle lamp that can improve heat radiation characteristics of semiconductor light emitting devices used as a light source, and also prevent mutual interference between plural light distribution patterns provided to the reflector so as to control respective light distribution patterns with high precision.

According to one or more aspects of the present invention, a vehicle lamp comprises: a plurality of semiconductor light emitting devices; and a reflector for reflecting light emitted from the semiconductor light emitting devices toward a front side of the vehicle lamp, the reflector being formed into a shape whose front area is open; a plate-like partition member disposed inside the reflector to partition the reflector into a plurality of reflecting areas, wherein the semiconductor light emitting devices are mounted on the plate-like partition member in the respective reflecting areas such that optical axes of the semiconductor light emitting devices themselves are directed in a direction substantially perpendicular to a lamp optical axis.

According to one or more aspects of the present invention, the respective reflecting areas are formed such that each of reflecting surfaces of the reflecting areas gives a light distribution pattern that is different from each other.

According to one or more aspects of the present invention, the plate-like partition member extends in a vertical direction so as to partition the reflecting areas into left and right areas and, one of the reflecting areas performs a converged light distribution and the other reflecting area performs a diffused light distribution.

According to one or more aspects of the present invention, optical components each having at least one of a lens function and shading function are provided to a forward area of the semiconductor light emitting devices, and the lens function adjusts an emission direction of light emitted from the corresponding semiconductor light emitting devices, and the shading function blocks a part of the light emitted from the semiconductor light emitting devices.

According to one or more aspects of the present invention, the optical components are a lens member having a ¼ spherical shape respectively.

Other aspects and advantages of the invention will be apparent from the following description, the drawings and the claims.

DETAILED DESCRIPTION

A vehicle lamp according to one or more embodiments of the present invention will be described in detail with reference to the accompanying drawings hereinafter.

Figure 1:
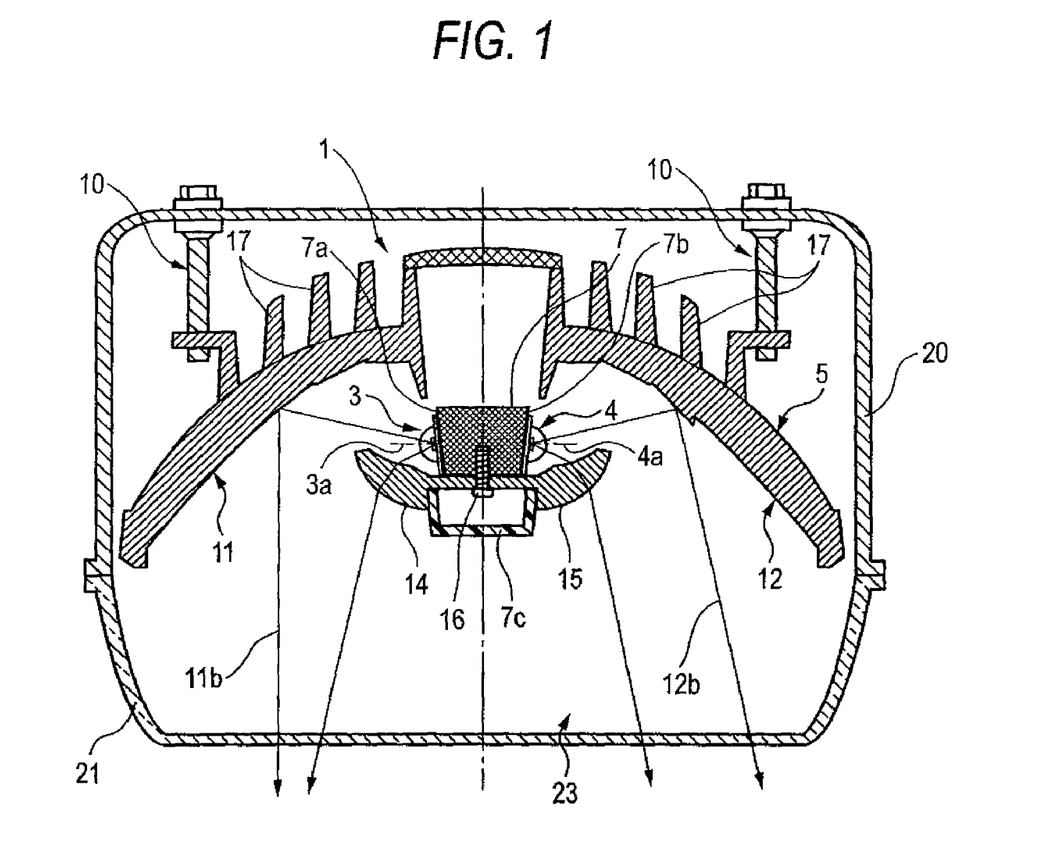
FIG. 1 is a horizontal sectional view showing a vehicle lamp according to an embodiment of the present invention.
Figure 2:
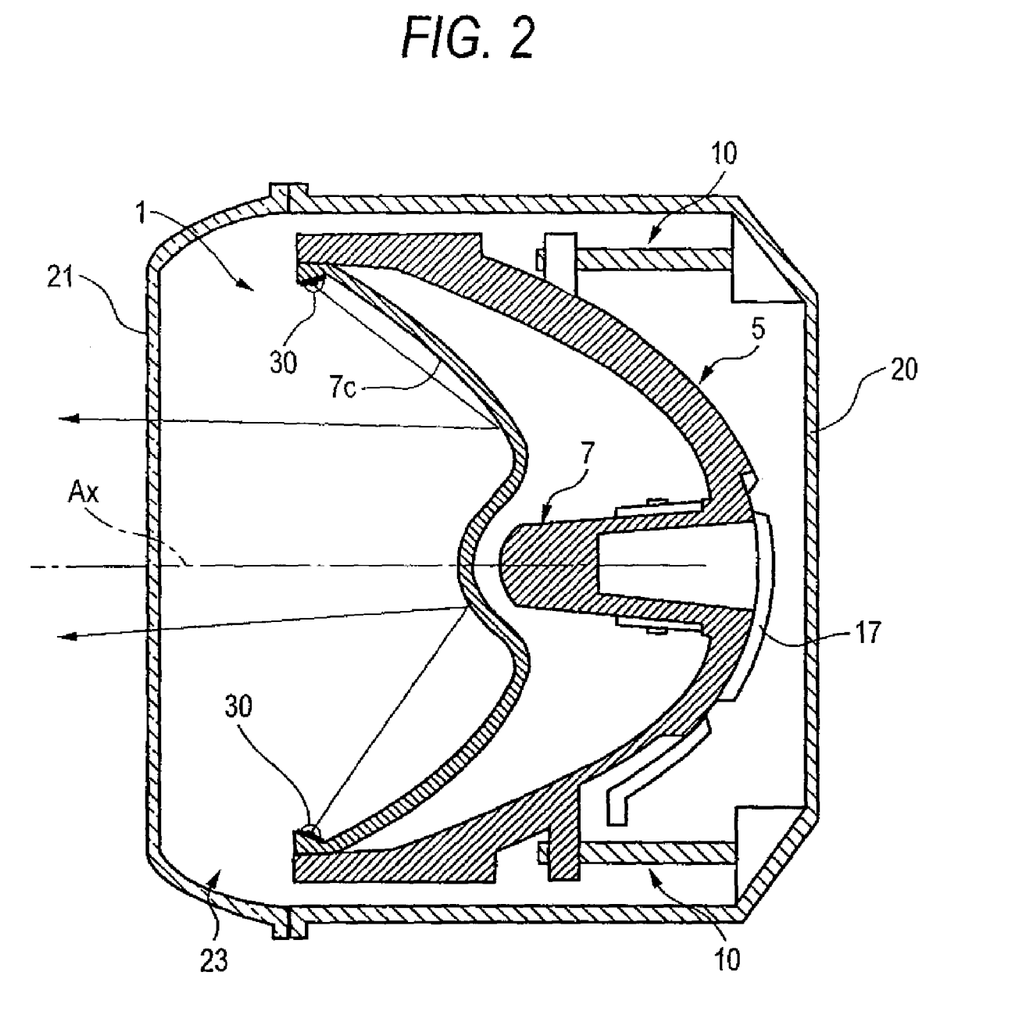
FIG. 2 is a longitudinal sectional view of the vehicle lamp shown in FIG. 1.
Figure 3:
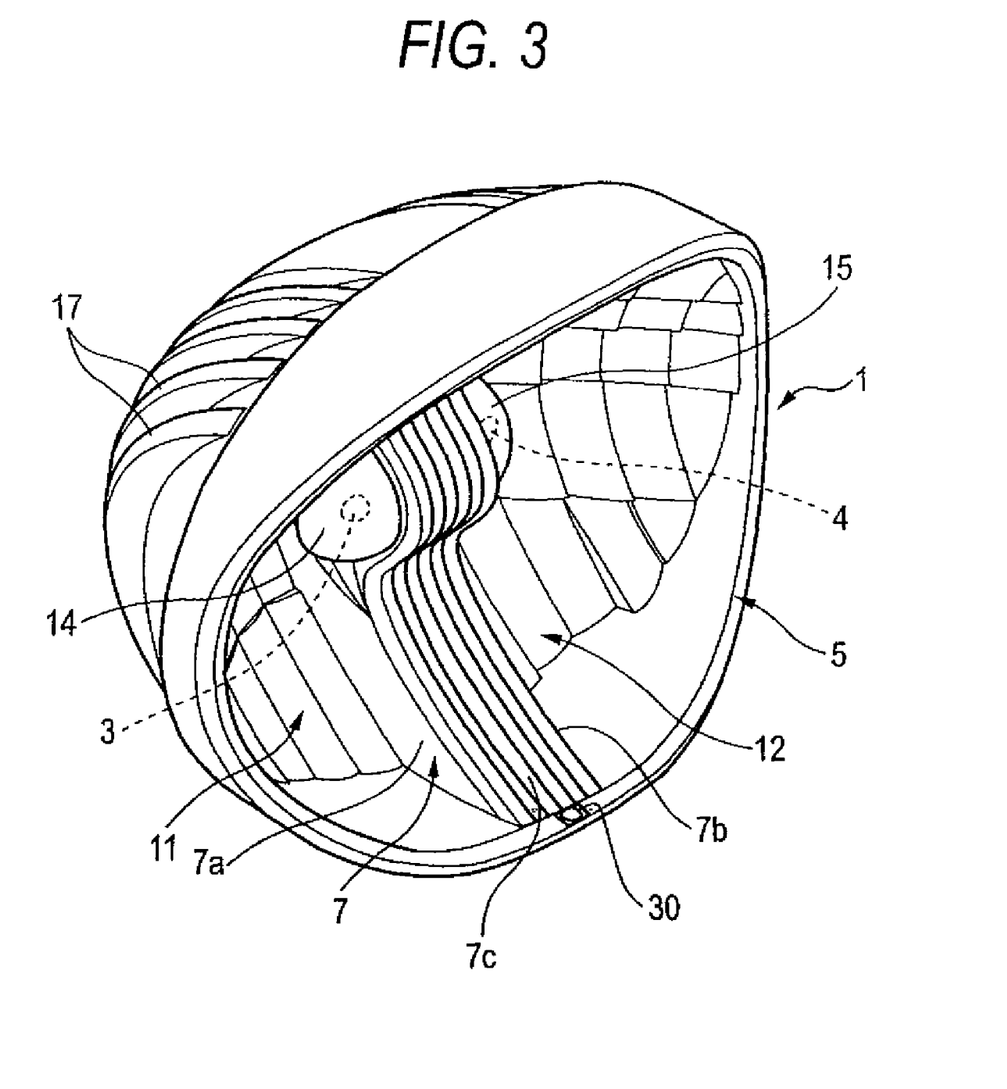
FIG. 3 is a perspective view of the vehicle lamp shown in FIG. 1.
Figure 4:
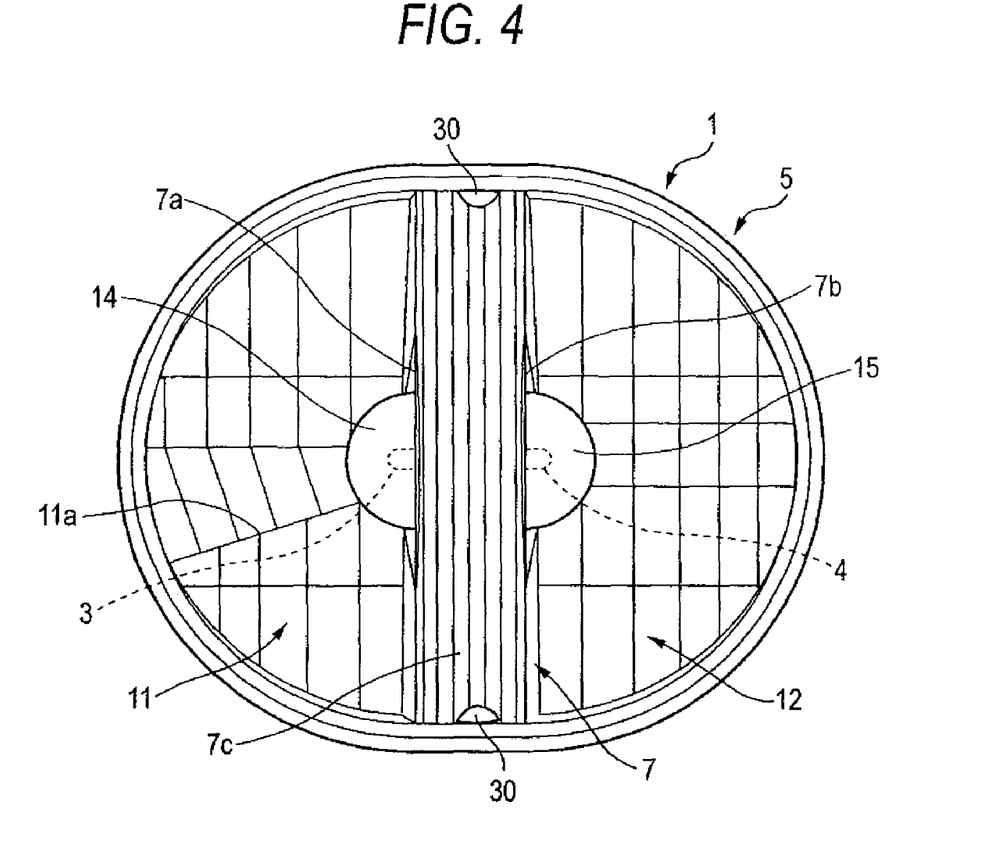
FIG. 4 is a front view of the vehicle lamp shown in FIG. 1.
Figure 5:
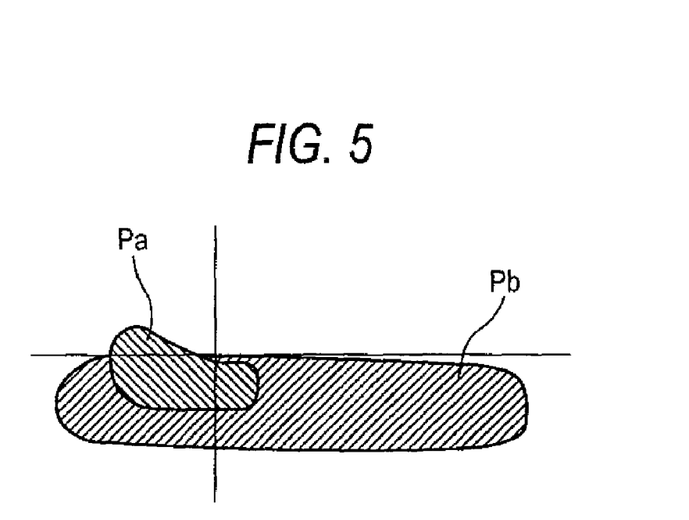
FIG. 5 is an explanatory view of a light distribution pattern formed by a combination of respective light distribution patterns in two type reflecting areas shown in FIG. 1.

FIG. 1 is a horizontal sectional view showing a vehicle lamp according to an embodiment of the present invention. FIG. 2 is a longitudinal sectional view of the vehicle lamp shown in FIG. 1. FIG. 3 is a perspective view of the vehicle lamp shown in FIG. 1. FIG. 4 is a front view of the vehicle lamp shown in FIG. 1. FIG. 5 is an explanatory view of a light distribution pattern formed by a combination of respective light distribution patterns in two type reflecting areas shown in FIG. 1.

As shown in FIG. 1 to FIG. 4, a vehicle lamp 1 is used as the headlamp of a car, or the like. This vehicle lamp 1 is equipped with two semiconductor light emitting devices 3, 4 used as a light source, and a reflector 5 for reflecting lights emitted from the semiconductor light emitting devices 3, 4 to a forward area of the lamp. This vehicle lamp 1 is arranged in a light compartment 23 that is constructed by a lamp body 20 whose front area is open, and a transparent front cover 21 fitted to the front opening portion of the body 20.

The reflector 5 is formed of the almost hemispherical (parabolic) aluminum die casting whose lamp front side is opened, and is fitted to the lamp body 20 via an aiming mechanism 10. When a fitting angle of the reflector 5 is changed via the aiming mechanism 10, an optical axis of a light emitted from the vehicle lamp 1 can be adjusted.

An inner space of this reflector 5 is partitioned into two left and right reflecting areas 11, 12 by a plate-like partition member 7 that extends in the reflector 5 in the vertical direction (the up-and-down direction).

In one or more embodiments, as respective semiconductor light emitting devices 3, 4, an LED having a predetermined luminous intensity is used. This LED is composed of a light emitting diode element mounted on the substrate, and a hemispherical cover for covering the light emitting diode element.

As shown in FIG. 1, respective semiconductor light emitting devices 3, 4 are arranged on the plate-like partition member 7 in the reflecting areas 11, 12 in such a manner that their optical axes (directions where a peak of a luminous intensity distribution is given) 3a, 4a of the devices themselves are directed almost perpendicularly to a lamp optical axis Ax.

Further, fitting positions of the semiconductor light emitting devices 3, 4 on the plate-like partition member 7 will be described below.

First, the semiconductor light emitting device 3 provided for the reflecting area 11 is arranged on a side surface 7a facing to the reflecting area 11 of the plate-like partition member 7 such that the optical axis 3a of the device itself is directed in the horizontal direction perpendicular to the lamp optical axis Ax. Also, the semiconductor light emitting device 4 provided for the reflecting area 12 is arranged on a side surface 7b facing to the reflecting area 12 of the plate-like partition member 7 such that the optical axis 4a of the device itself is directed in the horizontal direction perpendicular to the lamp optical axis Ax.

That is, respective semiconductor light emitting devices 3, 4 are arranged separately on both side surfaces 7a, 7b facing to the reflecting areas 11, 12 of the plate-like partition member 7.

Also, two reflecting areas 11, 12 partitioned by the plate-like partition member 7 are shaped such that respective reflecting surfaces give the mutually different light distribution patterns.

The reflecting area 11 positioned on the left side in FIG. 4 has a reflecting surface 11a that is tilted at 15° to the horizontal direction, and gives the light distribution to converge reflected lights 11b. Thus, as shown in FIG. 5, the reflecting area 11 obtains a converged light distribution pattern Pa with a high illuminance and a narrow irradiation area.

The reflecting area 12 positioned on the right side in FIG. 4 gives the light distribution to diffuse reflected light 12b such that all cut directions of the reflecting surfaces are set uniformly in the horizontal direction. Thus, as shown in FIG. 5, the reflecting area 12 obtains a diffused light distribution pattern Pb having a lower illuminance than the converged light distribution pattern Pa but having an irradiation area broadened in the horizontal direction.

A dimming means is connected to the semiconductor light emitting device 3 assigned to the converging reflecting area 11 so that, for example, when a motorway light distribution is to be provided, a quantity of light emission can be increased by enhancing a luminous intensity. More specifically, a leveling mechanism is equipped, which adjusts the lamp optical axis Ax upwardly by 0.34° by adjusting the fitting angle of the reflector 5. Thus, when the motorway light distribution is to be provided, a distance reached by an irradiation light emitted from the lamp is extended.

Figure 6:
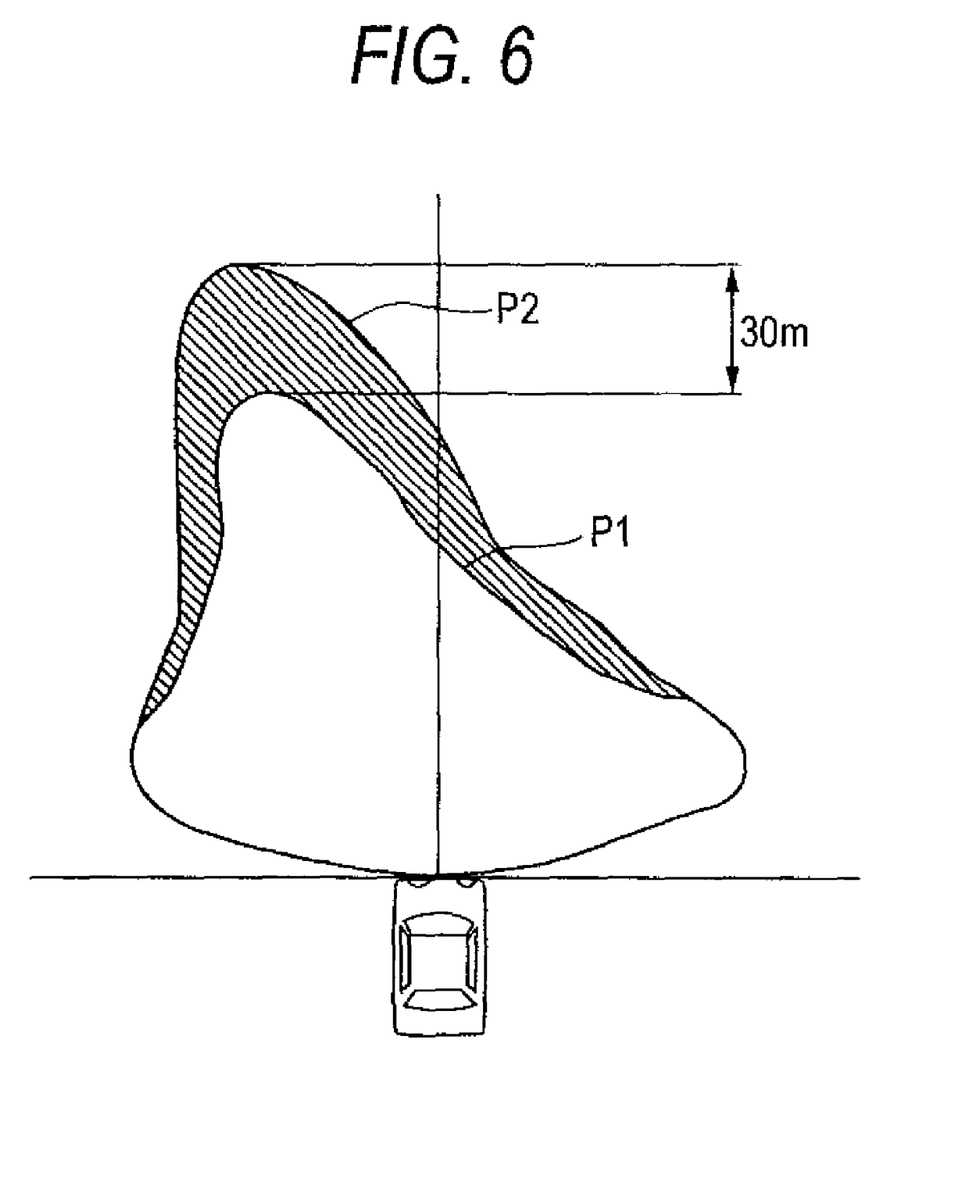
FIG. 6 is a comparative view of an ordinary light distribution and a motorway light distribution in the vehicle lamp according to an embodiment of the present invention.

FIG. 6 shows the light distribution pattern on the horizontal road surface when viewed from the top, and a vertical axis denotes a reaching distance of the irradiation light from the vehicle lamp 1.

In FIG. 6, a profile of a distributed light P1 shows a distance reached in the ordinary light distribution. Also, a profile of a distributed light P2 shows a distance reached in a motorway light distribution. This motorway light distribution is obtained when a luminous intensity of the converging semiconductor light emitting device 3 is increased by the dimming means and the lamp optical axis Ax is adjusted upwardly by 0.34° by the leveling mechanism. A distance reached by the distributed light can be extended by about 30 meters when the motorway light distribution is selected.

Also, in one or more embodiments, optical components 14, 15 for adjusting the distributed light are provided to the lamp front sides of the semiconductor light emitting devices 3, 4 arranged in the reflecting areas 11, 12 respectively.

In one or more embodiments, each of the optical components 14, 15 consists of a lens member that is integrally molded of a transparent resin or glass and whose outer surface is formed into a ¼ spherical shape. The optical components 14, 15 are screwed on the plate-like partition member 7 by a fitting screw 16. The optical components 14, 15 of one or more embodiments are provided with a lens function and a shading function. The lens function adjusts the emission direction of light emitted from the corresponding semiconductor light emitting devices 3, 4 to the forward area of the lamp, and the shading function blocks a part of light emitted from the semiconductor light emitting devices 3, 4.

The shading function prevents a situation in which the light is emitted to the forward area of the lamp by a total reflection in the lens. In this case, light shielding performance may be enhanced by forming a reflecting surface on the surface of the lens member by aluminum deposition, or the like.

As shown in FIG. 1 and FIG. 3, radiation fins 17 are formed on the rear surface of the reflector 5 at an appropriate interval. When a heat generated from the semiconductor light emitting devices 3, 4 is transferred to the reflector 5 via the plate-like partition member 7, the radiation fins 17 emit effectively the transferred heat to the outside.

Also, as shown in FIG. 1, a partition cover 7c for covering a front surface of the plate-like partition member 7 is provided on the front surface of the plate-like partition member 7. A surface of the partition cover 7c is formed as a reflecting surface, and constitutes a clearance lamp upon reflecting light from a pair of LEDs 30, 30 provided at upper and lower ends of the front area.

According to the vehicle lamp 1 described above, the plate-like partition member 7 mounted with the plurality of semiconductor light emitting devices 3, 4 has a large surface area (heat transfer area) across the reflector 5. Therefore, a sufficient heat radiation area can be ensured around the semiconductor light emitting devices 3, 4 used as the light source.

Therefore, the heat generated from the semiconductor light emitting devices 3, 4 can be radiated or such heat can be transferred effectively to the reflector 5, so that the heat can be radiated from the large back surface area of the reflector 5 to the outside. Thus, a temperature rise due to heat generation of the semiconductor light emitting devices 3, 4 themselves can be prevented. As a result, a reduction of the light emitting performance or the life of the semiconductor light emitting devices 3, 4 caused due to an excessive temperature rise can be prevented.

Also, the plate-like partition member 7 that partitions two reflecting areas 11, 12 functions as a light shielding wall for preventing a situation in which the light emitted from the semiconductor light emitting devices 3, 4 that is assigned to the reflecting areas 11, 12 enters into the respectively unassigned reflecting areas 11, 12. Also, the plate-like partition member 7 functions as another light shielding wall for preventing a situation in which a part of the light reflected by one reflecting surface is reflected again by other reflecting surfaces. Therefore, mutual interference between the light distribution patterns can be prevented, and, accordingly, the light distribution patterns can be formed by respective reflecting areas 11, 12 with high precision.

Also, in the vehicle lamp 1 of the above embodiments, two reflecting areas 11, 12 partitioned by the plate-like partition member 7 are constructed such that respective reflecting surfaces give the mutually different light distribution patterns.

Therefore, when two light distribution patterns are synthesized as a whole lamp, formation of the light distribution patterns in a more complicated illuminance distribution can be facilitated without any provision of a complicated light distribution adjusting mechanism such as a movable shade, or the like. As a result, formation of the light distribution patterns that conforms to the legal regulations for the illuminance distribution, and the like, can be facilitated.

Also, in the vehicle lamp 1 of one or more embodiments, the reflector 5 is constructed as follows: the plate-like partition member 7 is provided as the partition extending in the vertical direction and two left and right reflecting areas 11, 12 are partitioned/formed in such a way that one reflecting area 11 gives the converged light distribution and the other reflecting area 12 gives the diffused light distribution.

Therefore, as shown in FIG. 5, the converged light distribution pattern Pa has a high illuminance and irradiates a narrow irradiation area, and the diffused light distribution pattern Pb has a lower illuminance and irradiates a broad irradiation area. A composite light distribution pattern in which the converged light distribution pattern Pa and the diffused light distribution pattern Pb are combined together can be obtained, and thus an ideal light distribution responding to the driving mode, or the like, can be obtained.

Also, according to the vehicle lamp 1 of the above embodiments, the optical components 14, 15, which are provided with a lens function for adjusting the emission direction of light emitted from the corresponding semiconductor light emitting devices 3, 4 to the forward area of the lamp and a shading function for blocking a part of the light emitted from the semiconductor light emitting devices 3, 4, are provided to the lamp front side of the semiconductor light emitting devices 3, 4 arranged in the reflecting areas 11, 12.

Therefore, not only the light distribution adjustment performed by the reflecting surfaces of the reflector 5, but also, the light distribution adjustment performed by the optical components 14, 15 arranged on the lamp front side of the semiconductor light emitting devices 3, 4 can be applied. As a result the light distribution patterns can be adjusted with higher precision. In this case, it is obvious that the optical components according to the vehicle lamp of one or more embodiments of the present invention may have at least one of the lens function and the shading function.

Also, in the vehicle lamp 1 of the above embodiments, the optical components 14, 15 are the lens member having a ¼ spherical shape respectively.

Therefore, upon the illumination operation of the lamp, the optical components 14, 15 transmit light emitted from the semiconductor light emitting devices 3, 4, or the like and give an external appearance respectively as if such optical components 14, 15 themselves emitted the light. Hence, a design property as the lamp can be improved.

Further, the semiconductor light emitting devices, the reflector, the plate-like partition member, the reflecting area, etc. according to the vehicle lamp of the present invention are not limited to the configurations in the above embodiments. It is, of course, that various configurations may be employed within the spirit of the present invention.

For example, the plate-like partition member according to one or more embodiments of the present invention may be constructed to partition the reflector into three reflecting areas as a partition that extends in three directions from a center axis of the reflector, to partition the reflector into four reflecting areas as a cruciform partition that extends its plate-like partition members in the vertical and horizontal directions, or to partition the reflector into a larger number of reflecting areas as s partition whose number of plate-like partition members is increased accordingly more.

Also, when the number of partitions of the reflecting areas is increased, a dedicated semiconductor light emitting device may be provided every reflecting area.

Also, in the above embodiments, the semiconductor light emitting device is assigned to respective reflecting areas on a one-to-one basis. However, a plurality of semiconductor light emitting devices may be assigned to one reflecting area respectively or a quantity of light may be changed by changing the number of semiconductor light emitting devices provided to each reflecting area.

Also, other semiconductor light emitting devices, such as a Laser Diode (LD), may be employed instead of the LED.

According to the vehicle lamp having such configuration, the plate-like partition member equipped with plural semiconductor light emitting devices has a large surface area (heat transfer area) that cuts across an inside of the reflector. Therefore, a sufficient heat radiation area can be ensured around the semiconductor light emitting devices being fitted as the light source. As a result, a temperature rise due to heat generation of the semiconductor light emitting devices themselves can be prevented, and also a light emitting performance or a reduction of the life of the semiconductor light emitting devices caused due to an excessive temperature rise can be prevented.

Also, the plate-like partition member that partitions plural reflecting areas functions as a light shielding wall that prevents a situation in which the light being emitted from the semiconductor light emitting devices that is assigned to the reflecting areas enters into a respectively unassigned reflecting areas. Also, the plate-like partition member functions as another light shielding wall that prevents a situation in which a part of the light reflected by one reflecting surface is reflected again by other reflecting surfaces. Therefore, mutual interference between the light distribution patterns can be prevented, and the light distribution patterns can be shaped by respective reflecting areas with high precision.

Also, in the vehicle lamp of one or more embodiments, it is preferable that respective reflecting areas should be formed such that reflecting surfaces give a mutually different light distribution pattern respectively.

According to such a vehicle lamp, when two light distribution patterns are synthesized as a whole lamp, formation of the light distribution patterns in a more complicated illuminance distribution can be facilitated without providing a complicated light distribution adjusting mechanism such as a movable shade, or the like. Therefore, formation of the light distribution patterns that conform to the legal regulations for the illuminance distribution can be facilitated.

According to such a vehicle lamp, a converged light distribution pattern has a high illuminance and irradiates a narrow irradiation area, and a diffused light distribution pattern has a lower illuminance and irradiates a broad irradiation area, and accordingly a composite light distribution pattern where the converged light distribution pattern and the diffused light distribution pattern are combined together can be obtained. Therefore, an ideal light distribution responding to the driving mode can be obtained.

According to such a vehicle lamp, not only the light distribution adjustment performed by the reflecting surfaces of the reflector, but also, the light distribution adjustment performed by the optical components arranged on the lamp front side of the semiconductor light emitting devices can be applied. Therefore, the light distribution patterns can be adjusted with higher precision.

According to such a vehicle lamp, in the illumination operation of the lamp, the optical components transmit light emitted from the semiconductor light emitting devices and give an external appearance respectively as if such optical components themselves emitted the light. Therefore, a design property as the lamp can be improved.

According to the vehicle lamp of one or more embodiments of the present invention, the plate-like partition member equipped with plural semiconductor light emitting devices has a large surface area (heat transfer area) that cuts across an inside of the reflector. Therefore, a sufficient heat radiation area can be ensured around the semiconductor light emitting devices used as the light source. As a result, a temperature rise due to heat generation of the semiconductor light emitting devices themselves can be prevented, and also a light emitting performance or a reduction of the life of the semiconductor light emitting devices caused due to an excessive temperature rise can be prevented.

Also, the plate-like partition member that partitions plural reflecting areas functions as a light shielding wall that prevents a situation in which the light emitted from the semiconductor light emitting devices that is assigned to one reflecting area enters into the respectively unassigned reflecting areas. Also, the plate-like partition member functions as another light shielding wall that prevents a situation in which a part of the light reflected by one reflecting surface is reflected again by other reflecting surfaces. Therefore, mutual interference between the light distribution patterns can be prevented, and also the light distribution patterns can be shaped by respective reflecting areas with high precision.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A vehicle lamp, comprising:
    a plurality of semiconductor light emitting devices;
    a reflector for reflecting light emitted from the semiconductor light emitting devices toward a front side of the vehicle lamp, the reflector being formed into a shape whose front area is open; and
    a plate-like partition member disposed inside the reflector to partition the reflector into a plurality of reflecting areas,
    wherein the semiconductor light emitting devices are mounted on the plate-like partition member in respective reflecting areas such that optical axes of the semiconductor light emitting devices are directed in a direction substantially perpendicular to a lamp optical axis,
    wherein the plate-like partition member extends in a vertical direction so as to partition the reflecting areas into left and right areas,
    wherein one of the reflecting areas performs a converged light distribution and the other reflecting area performs a diffused light distribution, and
    wherein a lens is disposed on the partition member for deflecting light emitted from one of the semiconductor light emitting devices toward a front side of the vehicle lamp.

2. The vehicle lamp according to claim 1, wherein the reflecting areas are formed such that reflecting surfaces of each of the respective reflecting areas gives a light distribution pattern that is different from each other.

3. The vehicle lamp according to claim 1, further comprising:
    optical components, each having at least one of a lens function and shading function, provided to a forward area of the semiconductor light emitting devices,
    wherein the lens function adjusts an emission direction of light emitted from corresponding semiconductor light emitting devices, and
    wherein the shading function blocks a part of the light emitted from the semiconductor light emitting devices.

4. The vehicle lamp according to claim 3, wherein the optical components comprise a lens member having a ¼ spherical shape.

5. The vehicle lamp of claim 3, wherein the optical components are disposed such that light emitted by the corresponding semiconductor light emitting devices is directly incident on the optical components, and no light reflected by the reflector is incident on the optical components.

6. The vehicle lamp according to claim 1, further comprising a plurality of radiation fins formed on a rear surface of the reflector.

7. The vehicle lamp according to claim 6, wherein the plate-like partition member is arranged inside the reflector so as to form heat transfer path from the semiconductor light emitting devices to the radiation fins formed on the rear surface of the reflector.

8. The vehicle lamp according to claim 1, wherein the semiconductor light emitting devices are laser diodes.

9. The vehicle lamp of claim 1, further comprising:
    a partition cover for covering a front surface of the plate-like partition member disposed on the front surface of the plate-like partition member, wherein a surface of the partition cover is formed as a reflecting surface; and
    a clearance lamp light emitting device disposed at least one of at an upper end and a lower end of the front area of the reflector.

10. The vehicle lamp of claim 9, wherein at least one clearance lamp light emitting device is disposed at an upper end and a lower end of the front area of the reflector.

11. The vehicle lamp of claim 1, further comprising a lens for deflecting light emitted by one of the semiconductor light emitting devices forward, and wherein the vehicle lamp transmits light reflected by the reflector without altering its direction, and the lens is disposed such that light emitted by the one of the semiconductor light emitting devices is directly incident on the lens, and no light reflected by the reflector is incident on the lens.

12. A vehicle lamp, comprising:

a plurality of semiconductor light emitting devices;

a reflector for reflecting light emitted from the semiconductor light emitting devices toward a front side of the vehicle lamp;

a plate-like partition member disposed inside the reflector to partition the reflector into a plurality of reflecting areas; and a lens disposed on the partition member for deflecting light emitted from one of the semiconductor light emitting devices toward a front side of the vehicle lamp.

13. The vehicle lamp of claim 12, wherein the vehicle lamp transmits light reflected by the reflector without altering its direction, and the lens is disposed such that light emitted by the one of the semiconductor light emitting devices is directly incident on the lens, and no light reflected by the reflector is incident on the lens.

* * * * *